US005459915A

United States Patent [19]
Mendenhall

[11] Patent Number: 5,459,915
[45] Date of Patent: Oct. 24, 1995

[54] HIGH ACCURACY MACHINING STATION FOR A MULTIPLE SPINDLE ROTARY INDEXING MACHINE TOOL

[75] Inventor: Jesse W. Mendenhall, Fairfield, Conn.

[73] Assignee: DeVlieg-Bullard, Inc., Rockford, Ill.

[21] Appl. No.: 228,061

[22] Filed: Apr. 15, 1994

[51] Int. Cl.$^6$ .............................. B23B 9/12; B23B 13/04
[52] U.S. Cl. ...................... 29/38 A; 29/38 C; 82/129
[58] Field of Search .................... 29/38 A, 38 B, 29/563, 38 C; 82/129, 118

[56] References Cited

U.S. PATENT DOCUMENTS

| | | | |
|---|---|---|---|
| 3,203,316 | 8/1965 | Cashman et al. | |
| 4,159,660 | 7/1979 | Buckley et al. | 82/3 |
| 4,197,769 | 4/1980 | Smith et al. | 82/3 |
| 4,351,096 | 9/1982 | Depweg et al. | 29/38 |
| 4,631,684 | 12/1986 | Akasofu et al. | 364/474 |
| 4,642,861 | 2/1987 | Riley et al. | 29/38 |
| 5,084,660 | 1/1992 | Sasaki et al. | 318/569 |
| 5,182,974 | 2/1993 | Cudini et al. | 82/124 |

FOREIGN PATENT DOCUMENTS

| | | |
|---|---|---|
| 2735120 | 2/1979 | Germany . |
| 62-292302 | 12/1987 | Japan . |

*Primary Examiner*—Z. R. Bilinsky
*Attorney, Agent, or Firm*—Jenner & Block

[57] ABSTRACT

The invention relates to improvements in the multiple spindle rotary indexing machine tool systems of the prior art. Traditionally, such machine tool systems include a base and an upstanding vertical column which houses a plurality of machining stations each equipped with two-axis tool slides. In addition, the base supports a rotatable worktable, which carries a number of work-holding spindles. As the worktable rotates, these spindles are indexed through successive machining stations where a variety of operations are performed. In accordance with the invention, a spindle position measurement unit is provided to dynamically measure the exact location of each spindle indexed to position at a modified machining station. A computerized numerical control system calculates spindle position errors based on the position information provided by the measurement unit and offsets tool slide position commands to compensate for those errors. As a result, the control unit compensates for both fixed and variable spindle position variations, thus improving the machining tolerances of the machine tool apparatus. In accordance with another aspect of the invention, a high accuracy finishing station is provided which includes spindle position variation measurement and compensation in combination with an independent X and Y axis tool slide positioning system. The tool slide positioning system is responsive to CNC commands for speed control and position offset due to spindle errors.

19 Claims, 4 Drawing Sheets

HIGH ACCURACY MACHINING STATION FOR A MULTIPLE SPINDLE ROTARY INDEXING MACHINE TOOL

FIELD OF THE INVENTION

This invention relates to machine tools, and more specifically to a multiple station, rotary indexing machine tool having one or more finishing stations at which workpiece positioning errors are accurately measured and tool position commands are offset to compensate for said positioning errors.

BACKGROUND OF THE INVENTION

Multiple station, rotary indexing machine tool equipment is common in manufacturing installations and enjoys a high degree of commercial success. One of the most successful designs is disclosed in U.S. Pat. No. 2,947,188 issued to Bullard, et al. As described in Bullard et al., the multiple station machine tool comprises a circular base from which extends a fixed vertical column. The vertical column houses several machining stations consisting of tool slides that can move independently along vertical and horizontal axes. The base of the machine tool also supports a rotary worktable, or carrier, which is divided into multiple spindle stations each containing one or more workpiece carrying spindles. Machine tool equipment of this general description is commercially available as of the filing date hereof by DeVlieg-Bullard, Inc. of Westport, Connecticut, under the trade designation, "Type L Mult-Au-Matic Vertical Chucking Machines."

In operation, the worktable rotates around the vertical column indexing the spindles to successive machining stations. At each machining station, a particular operation is performed on the part carried by the spindle. Spindle speeds and tool feed rates at each station are set in reference to the operation performed. After a given operation is completed, the tools are retracted and the worktable rotates thus indexing the spindle stations so that different machining operations can be performed at the next machining station. Typically, a single drive motor provides the rotary power that drives all machine tool functions: worktable rotation, tool slide positioning and spindle rotation.

Despite the success of this highly pervasive design, multiple station machine tools of the type described above suffer from a number of shortcomings. First, the unified drive system mentioned above limits the types of machining operations that can be carried out by the machine. For example, it is not possible to vary the rates of horizontal and vertical tool slide movement given the arrangement of the tool slide drive mechanism, which makes it impractical to perform contouring operations. More significantly, the degree of precision obtainable by such a machine tool is substantially limited by the nature of the machine, its size and its mechanical complexity.

In a typical Mult-Au-Matic-type machine tool system, the actual position of each spindle can vary relative to the machine tool as the workpieces are indexed to successive machining stations. These positional variations come in two varieties. First, the exact location of each spindle within the worktable can vary from spindle to spindle. Second, the locking position of each spindle station indexed to a particular machining station can vary due to machine wear and operating conditions. As a result, the location of each spindle relative to the machining station can vary unpredictably. Notably, because the worktable diameter of a typical Mult-Au-Matic style machine can be six feet or more, the magnitude of these variations in position can be significant. The uncertainty of actual spindle position creates errors in the machining operations which have previously limited the machining tolerances achievable by an unmodified Mult-Au-Matic machine tool.

Due to the great popularity of this machine tool design, several attempts have been made to provide improvements. One such attempt is described in U.S. Pat. No. 4,351,096 to Depweg et al. The enhancements described in Depweg et al. include a modified machining station having independent drive motors for both tool slide positioning and spindle rotation. The individual drive motors of this modified station are connected to a computerized numerical control ("CNC") system which can control the motor speeds to provide variable speed operation. In addition, the CNC system can be programmed during machine installation to compensate for the fixed positional variation of each spindle within the surface of the worktable.

Although the improvements described in Depweg et al. provide improved machining tolerances (up to 0.0001 inch), they also suffer from a number of significant drawbacks. First, the use of separate drive motors to control spindle rotation and horizontal and vertical tool slide motion adds mechanical complexity and cost to the system. Second, the placement of these drive motors, and particularly the placement of the tool slide motor above the feed works platform of the machine tool, makes it difficult to upgrade an existing machine tool in a retrofit installation. Finally, no mechanism is provided for measurement and compensation for the dynamic variations in spindle station locking position.

As noted above, the variation in locking position of each spindle station is a non-repeatable error and can be expected to vary unpredictably during machine operation. Therefore, in order to compensate for such variations, the actual spindle position must be dynamically measured. Prior multiple station machine tool systems, including prior enhancements to conventional Mult-Au-Matic-type machines, fail to teach a structure for providing such error measurement and compensation.

Therefore, it will be desirable to provide a multiple station machine tool that is capable of improved machining accuracy. Moreover, it would be desirable to provide enhancements to the popular Mult-Au-Matic-type machine tool that provide such improved accuracy, wherein the enhancements could be added to the machine tool in a retrofit installation.

SUMMARY OF THE INVENTION

The principal object of the invention is to provide an improved multiple station machine tool that overcomes the limitations of the prior art. More specifically, it is an object of the present invention to provide a high accuracy, multiple station rotary indexing machine tool that compensates for fixed and variable spindle position errors at each machining station. In addition, it is an object of the invention to provide enhancements to a conventional multiple station machine tool that are suitable for retrofit installation on existing machines, enabling those machines to be upgraded significantly to more modern production requirements.

In accordance with the present invention, a multiple spindle rotary indexing machine tool is provided which includes a device for measuring the actual spindle position at one or more machining stations and a programmable control system for providing offsets to tool position commands to compensate for both variable and non-variable position errors. In addition, a spindle recognition device can be added to uniquely identify each spindle that is indexed to position at a given machining station and transmit this spindle identifier to the programmable control system.

The position measuring device includes a selectively-actuable gauge that measures the precise location of each spindle or spindle station as it is indexed into position at the machining station. In the preferred embodiment, the gauge comprises a hydraulically driven arm which swings into contact with a reference point on the worktable that corresponds to the currently indexed spindle or spindle station. When machining operations on that spindle station are completed, the arm swings out of the way so that a new spindle station can be indexed to the machining station. In addition, the measuring device includes a measurement probe which outputs a signal corresponding to the exact location of the spindle station. The measuring device is advantageously constructed in a compact, self-contained unit which can be easily installed between the rotatable worktable and the base of an existing machine at any or all of the machining stations.

In another aspect of the present invention, a conventional multiple spindle rotary indexing machine tool can be enhanced with one or more finishing stations that provide high accuracy machining operations. The finishing station comprises a measuring means for measuring the actual position of the spindles, a two-axis independent tool positioning system and a CNC programmable control system for controlling tool position. The tool positioning system is responsive to tool offset commands generated by the CNC unit in order to compensate for both non-variable and variable spindle position errors that are dynamically measured by the measuring means. Unlike the independent tool slide drive systems of the prior art, the independent positioning system of the present invention is accessibly mounted beneath the feed works platform of a conventional Mult-Au-Matic-type machine, thereby providing increased ease of installation.

Other objects and features of the invention will be apparent from the following description and from the drawings.

DETAILED DESCRIPTION OF THE INVENTION

Figure 1:
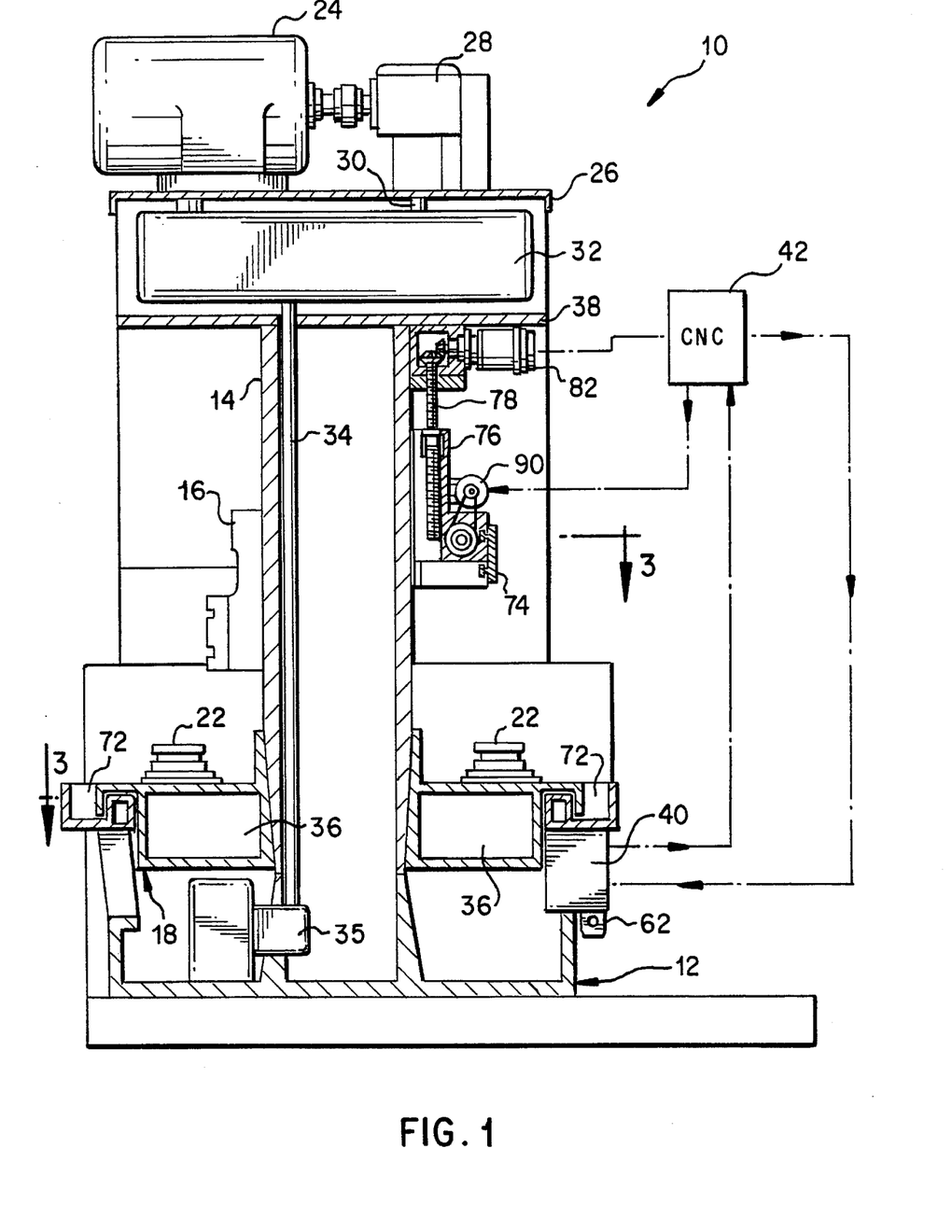
FIG. 1 is a longitudinal cross-sectional view of a multiple spindle rotary indexing machine tool incorporating the principles of the invention.

FIG. 1 illustrates a machine tool apparatus 10 comprising a base 12 from which extends a vertical column 14 divided into a plurality of machining stations, each having tool holding slides 16. Base 12 supports a rotatable worktable or carrier 18 which is divided into a number of spindle stations 20 shown in FIG. 3, each comprising one or more workpiece carrying spindles 22. The general construction of machine tool apparatus 10 is in accordance with the machine tool described in U.S. Pat. No. 2,947,188 issued to Bullard et al. and U.S. Pat. No. 4,351,096 issued to Depweg et al., each owned by the assignee of the present invention, and the disclosure of each is hereby incorporated by reference into the present application.

In a conventional Mult-Au-Matic machine tool, a single primary drive motor 24 provides rotary power for all indexing, tool slide positioning and spindle rotation. Primary drive motor 24 is mounted on a drive platform 26 at the top of the machine tool apparatus 10. Motor 24 output is coupled through bevel gears 28 to a vertical drive shaft 30. The drive shaft 30 is, in turn, connected through a feed works system 32 which contains individual feed work units (not illustrated) for the tool slides 16 of each machining station of the machine tool apparatus 10. The feed works system 32 is supported by a feed works platform 38 which separates the feed works from the machining area. Rotary power for worktable indexing and spindle rotation is provided by a vertical spindle transmission shaft 34 which extends from the feed works 32 to the base housing 12.

During worktable indexing, a synchronizing element 35 that is located within base housing 12 disengages the spindle drive mechanism 36 and engages a worktable drive mechanism (not illustrated) to advance the spindles 22, and thus the workpieces mounted on the spindles, to a new machining station. Thereafter, the spindle drive mechanism 36 is reengaged to provide rotary power to the spindles 22 for machining operations. Similarly, the movement of tool slides 16 along horizontal and vertical axes is provided by a complex arrangement of gears and clutches within feed works system 32. The feed works system is also driven by primary drive motor 24 through drive shaft 30. The construction and operation of the feed works mechanism of a conventional Mult-Au-Matic machine tool is described more fully in the aforementioned prior patents and therefore is not described in detail herein.

In accordance with the present invention, an error measurement and control means is provided to compensate for both fixed and variable position errors of the spindles 22 at a particular machining station. The error compensation system includes a spindle position measuring unit 40 for accurately determining the actual position of each spindle 22 that is advanced to position at the machining station. In addition, a programmable control system 42 is provided to respond to the spindle position signal provided by the measuring unit 40 and generates an offset to the tool slide position commands based on the magnitude of the spindle position error. Because spindle position is dynamically measured, the system of the present invention can compensate for non-repeatable variations in spindle position and thus provide a high degree of accuracy in machining operations.

Figure 2:
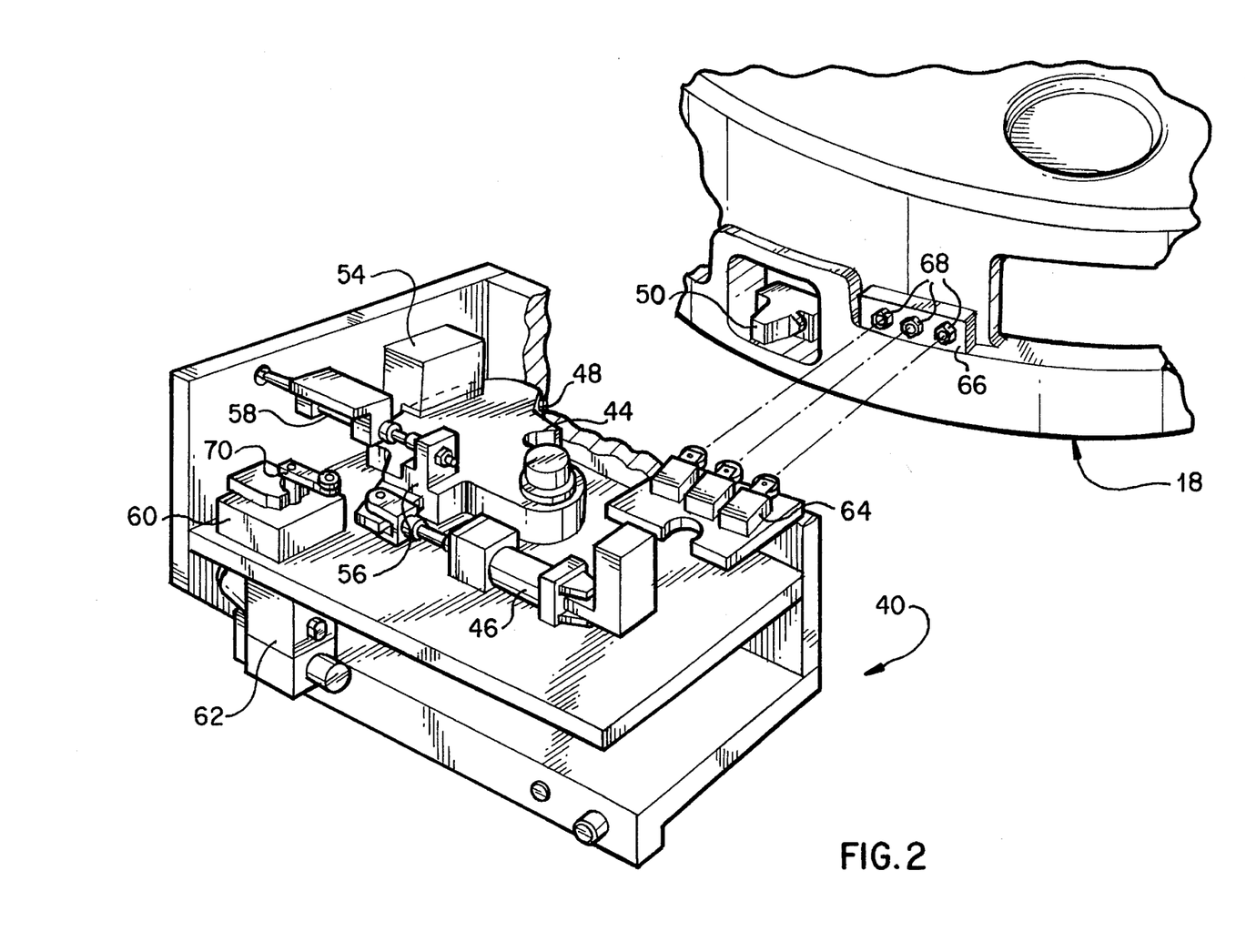
FIG. 2 is a perspective view of a spindle position measurement unit.

Measurement unit 40 essentially comprises a selectively actuable gauge which can be controlled from signals supplied by external means. As best illustrated in FIG. 2, unit 40 includes a pivoting arm 44 which is actuated by a hydraulic cylinder 46. At one end of arm 44 is a nub 48 which comes into contact with a reference block 50 mounted to the outer edge of worktable 18. Arm guide 54 promotes the smooth operation of the arm 44 as it moves into contact with the reference block 50. The reference block 50 corresponds to a particular spindle station 20 carried by the worktable 18. A measurement probe 58, mounted in a fixed position on unit 40, measures the distance between the probe tip and a probe contact bracket 56 mounted to the top surface of arm 44. The distance between the probe bracket 56 and the tip of probe 58 is equivalent to the locking position of the spindle station 20 at the machining station served by unit 40. The probe 58 outputs a signal representing the measured distance. Although the invention is illustrated for use with a machine tool that has one spindle per spindle station, the invention can also be used with a machine tool apparatus that has two or more spindles per spindle station.

The measurement unit 40 also contains a device for identifying each spindle 22 or spindle station 20 indexed at the machining station which is served by unit 40. The spindle identification device includes binary code switches 64 mounted to the inner edge of unit 40. The switches 64 trigger in the presence of corresponding binary code contact buttons 68, which are affixed to a binary code block 66 mounted to the outer edge of worktable 18 for each spindle station. The output of binary switches 64 together comprise a binary coded decimal number representing the identification number of the spindle station. Therefore, the number of contact buttons 68 on each binary code block 66 uniquely identifies each spindle station 20. In the illustrated example, three binary code buttons 68 (representing a binary coded signal 111) identify spindle station number 7. In the preferred embodiment, the programmable control system 42 comprises a computerized numerical control system ("CNC"), which can be any of a variety of commercially available designs. Thus, the binary coded signal output by the identification device can be used by the CNC controller 42 as part of its digital logic programming as described below.

The operation of the measuring unit 40 in conjunction with the error correction system of the present invention will be described with reference to FIGS. 1–2. At machine setup, two reference and calibration measurements are taken for each spindle 22 and spindle station 20 on machine tool apparatus 10. First, the position of each spindle relative to the vertical column 14 is determined at each machining station having error correction capabilities in accordance with this invention. This location should remain constant throughout the life of apparatus 10. Next, the measuring unit 40 is used to take the "zero-reference" measurement of each spindle station at the machining station. The zero-reference is the calibrated location of the reference block 50 for each spindle station 20 at the machining station along the direction of worktable 18 rotation. These two reference signals are stored in memory within CNC 42 at locations that correspond to the spindle station identifier.

During operation of machine tool apparatus 10, error measurement and correction is employed in coordination with machine tool indexing operations. Measurement unit 40 advantageously includes a switch system for coordinating its activities with the operation of machine tool apparatus 10. The switch system includes an index circuit switch 60 for providing a signal to machine tool apparatus 10 that indicates the current state of arm 44. In addition, a solenoid valve 62 is operatively connected to the machine tool apparatus 10. Valve 62 controls the flow of hydraulic fluid to hydraulic cylinder 46, and thus controls the operation of measuring arm 44.

Upon completion of a machining operation at a spindle station 20, solenoid valve 62 is triggered allowing hydraulic fluid to flow through hydraulic cylinder 46 such that arm 44 retracts away from contact with spindle station reference block 50. As arm 44 retracts, it moves into contact with index circuit switch lever 70. The movement of lever 70 opens the index circuit switch 60 which signals the machine tool apparatus 10 that spindle station indexing may now occur. The worktable 18 then rotates which moves a new spindle station 20 into position at the machining station.

Figure 3:
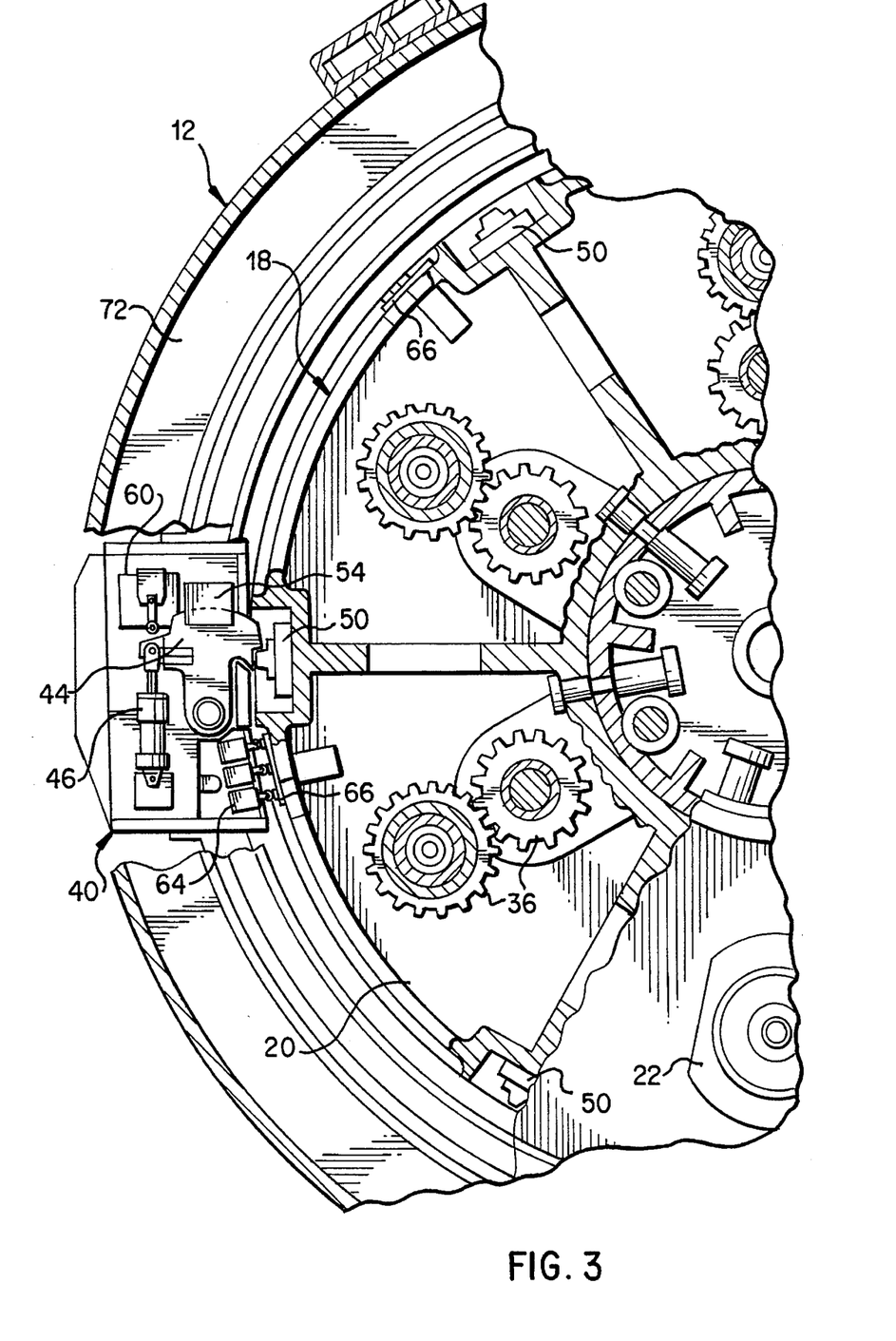
FIG. 3 is a cross sectional view taken generally on lines 3—3 of FIG. 1.

Once the spindle station has locked into place, solenoid 62 is again triggered which reverses the flow of hydraulic fluid through cylinder 46, thus moving measuring arm 44 into contact with reference block 50 as shown in FIG. 3.

After arm 44 has made contact with reference block 50, probe 58 measures the distance between the probe tip and the probe contact bracket 56. As noted above, this measurement is provided as an output signal which, in the preferred embodiment, is a digitally encoded signal for direct use by CNC system 42. Simultaneously, CNC 42 reads the binary code switches 64 to obtain the identifier for the new spindle station 20. The spindle station identifier corresponds to an offset within a CNC 42 reference table where the calibration reference signals for the spindle station are located. CNC 42 first subtracts the zero-reference measurement value from the actual spindle station position provided by measurement probe 58. The resulting position error is then algebraically added to the fixed variation in spindle position also measured during machine installation. Finally, CNC 42 uses this absolute position error to appropriately offset tool slide position commands to compensate for the errors during machining.

The measurement unit 40 constructed in accordance with this invention is a compact and self-contained unit that is easily installed into existing machines in the field. As best seen in FIG. 3, unit 40 can be mounted in the space provided between the outer edge of worktable 18 and the inner edge of machine base 12. Furthermore, measurement unit 40 can be installed beneath the chip trough 72 of an ordinary machine tool apparatus 10, thus protecting the moving parts of unit 40 from damage that can be caused by the influx of minute chip fragments into the interior of unit 40.

In accordance with another aspect of the invention, a finishing station for a multiple station, rotary indexing machine tool apparatus is provided for performing complex, high accuracy machining operations. The finishing station includes independent horizontal and vertical positioning tool slides 74 and 76 operating under the control of CNC unit 42 in conjunction with the error measurement and compensation system described herein. All modifications required to construct a finishing station in accordance with this invention can be inexpensively made and are suitable for retrofit installation in existing machines.

Figure 4:
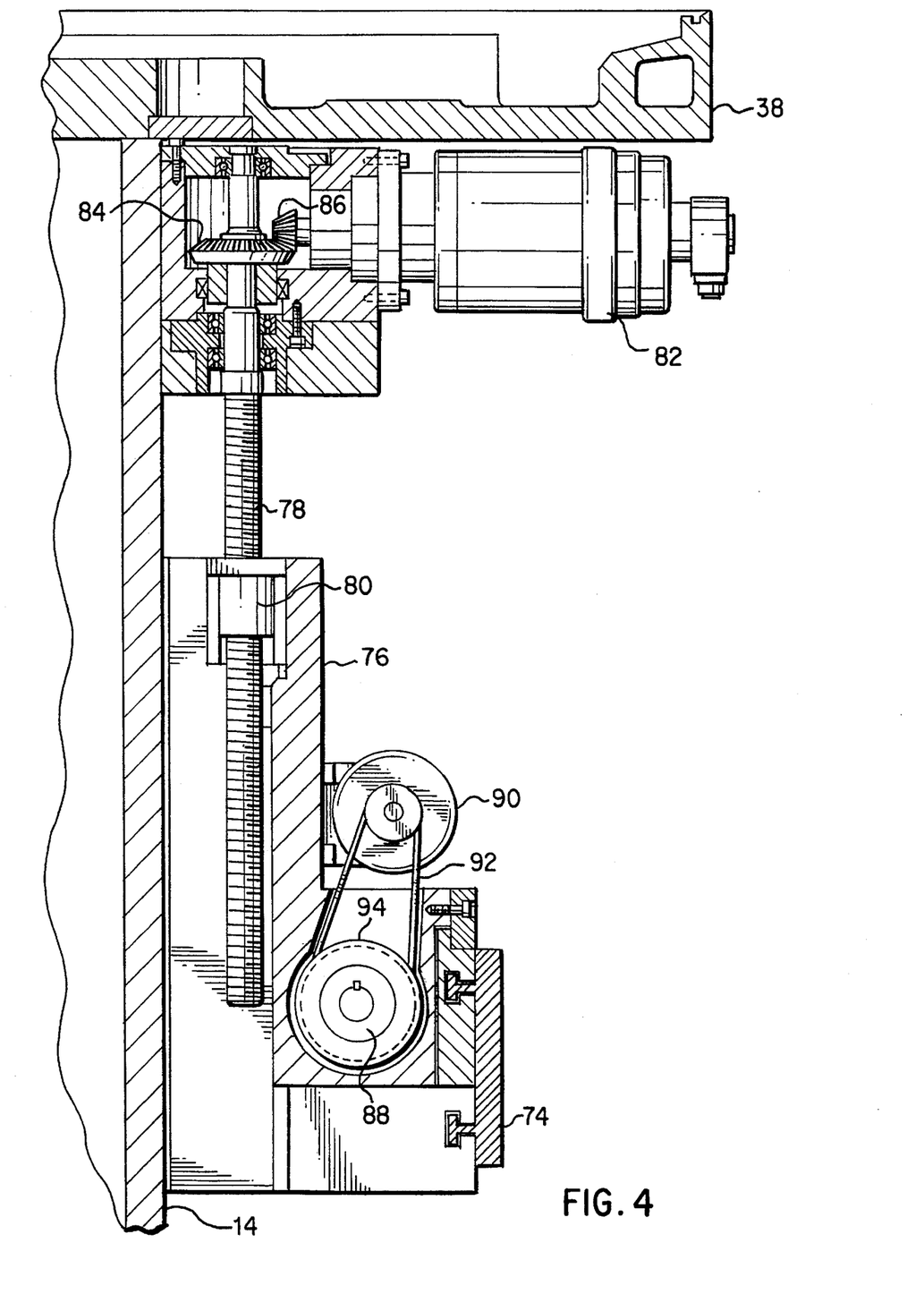
FIG. 4 is a cross sectional view illustrating the independent tool drive system for a finishing station of the machine tool apparatus of FIG. 1.

Unlike the tool slides in a conventional Mult-Au-Matic machine tool, the tool slides of the modified finishing station use an independent drive system. As illustrated in FIG. 4, vertical tool slide 76 is connected to a threaded shaft 78 through ball screw element 80, which together provides vertical motion of the tool slide. Shaft 78 is driven by servomotor 82 through bevel gears 84 and 86. Similarly, horizontal tool slide 74 is connected to a threaded shaft 88, which is in turn driven by a servomotor 90 through a belt 92 and pulley 94 transmission system. Both the horizontal and vertical tool slides move within the same horizontal and vertical guide rails (not shown), respectively, that are used by the conventional feed works driven tool slides. Moreover, servomotors 82 and 90 can be any one of a number of conventional designs that are adapted to receive position commands from a CNC control unit 42.

When used in conjunction with the error measuring system of the present invention, the finishing station can achieve a high degree of machining accuracy. To accomplish this purpose, finishing station is equipped with a spindle position measuring unit 40. CNC 42 receives position error information from unit 40 and calculates tool position offsets to compensate for spindle position errors as described above. As a result of the flexibility provided by the independent servomotor control of horizontal and vertical tool movement, however, tool position algorithms within CNC 42 can more readily compensate for spindle position variations.

As illustrated in FIG. 1, the tool slides of finishing station are advantageously mounted for easy installation as a field retrofit to an existing Multi-Au-Matic type machine tool. First, the tool slides and the servomotors comprise a self-contained unit with the horizontal servomotor being mounted on the horizontal tool slide itself. Second, the tool slide unit is compact enough to mount underneath the feed works platform 38 of machine tool apparatus 10 in a highly accessible location. This avoids the installation problems found in prior Mult-Au-Matic enhancements which required the vertical servomotor to be mounted above the feed works platform 38 among the complex arrangement of feed works for the conventional machining stations.

Very complex machining operations may be carried out at finishing stations that are equipped with the enhancements of the present invention. For example, because horizontal and vertical tool slide motion is controlled independently, the rates of tool feed movement along the two axes can be varied to perform contouring operations upon the workpiece. Moreover, position measurement unit 40 and CNC system 42 provide flexible and dynamic error compensation such that machining operations can be carried out to extremely close tolerances. Because spindle positional variations are accurately measured and accounted for by using the enhancements of this invention, such precision can be accomplished without the need for an independent spindle drive system, thus eliminating significant mechanical complexity and cost.

While illustrative embodiments of the invention are shown in the drawings and are described in detail herein, the invention is susceptible of embodiment in many different forms. It should be understood that the present disclosures are to be considered as an exemplification of the principles of the invention and are not intended to limit the invention to the embodiment illustrated.

I claim:

1. A multiple station, rotary indexing machine tool comprising a base, a vertical column extending upwards from the base, said machine tool having a plurality of machining stations each with a tool slide, a rotatable worktable mounted to said base, a plurality of workpiece carrying spindles spaced around said worktable and means for indexing said worktable to advance said spindles to successive machining stations, one or more of said machining stations comprising:

measuring means for measuring the actual position of each of said spindles that are advanced to position at said machining station and providing an output signal therefor; and programmable control means responsive to said spindle position signal for providing an offset correction signal to the tool slide of said machining station to compensate for positional variation of said spindle.

2. The machine tool of claim 1 further comprising spindle recognition means for uniquely identifying each of said spindles positioned at said machining station and providing an output signal therefor to said programmable control means.

3. The machine tool of claim 1 wherein said measuring means includes a selectively actuable gauge for measuring the positional variation of said spindles in the direction of rotation of said worktable.

4. The machine tool of claim 3 wherein said gauge is actuated to measure the position of each spindle when said spindle is advanced to said machining station.

5. The machine tool of claim 3 wherein said measuring means further comprises switching means for retracting said gauge when machining operations are completed on said spindle and for subsequently indexing said machine tool when said gauge is fully retracted.

6. The machine tool of claim 1 wherein said machining stations further comprise a two-axis drive means for the tool slide at said machining stations wherein said drive means is independent from a primary drive means of the remaining machining stations of said machine tool.

7. The machine tool of claim 6 wherein said drive means includes separate X and Y axis positioning motors.

8. The machine tool of claim 7 further comprising a feed works platform mounted on said column for supporting the primary drive system of the remaining machining stations of said machine tool, and wherein said positioning motors are mounted to said column beneath said feed works platform.

9. The machine tool of claim 1 further comprising means for measuring a fixed position variation and a zero-reference position of each of said spindles around said worktable and providing said reference position to said programmable control means.

10. The machine tool of claim 9 wherein said programmable control means calculates said positional variation for each of said spindles by subtracting said actual spindle position from said zero-reference spindle position and adding the difference to said fixed position variation algebraically.

11. The machine tool of claim 1 wherein said programmable control means comprises a computerized numerical control system.

12. A multiple station, rotary indexing machine tool comprising a base, a vertical column extending upwards from the base, said machine tool having a plurality of machining stations each with a tool slide, a rotatable worktable mounted to said base, a plurality of workpiece carrying spindles spaced around said worktable and means for indexing said worktable to advance said spindles to successive machining stations, said machine tool having at least one finishing station comprising:

independent X and Y axis positioning motors for moving the tool slide at said finishing station;

a controllably actuable gauge for measuring the precise location of each of said spindles that are advanced to position at said finishing station and providing an output signal therefor; and a control unit for receiving said spindle location signal and coordinating said axis positioning motors of said tool slides to compensate for positional variations of said spindles.

13. The multiple station machine tool of claim 12 further comprising means for uniquely identifying each of said spindles positioned at said finishing station and providing an output signal to said control unit.

14. The machine tool of claim 12 wherein said gauge further comprises switching means for retracting said gauge when machining operations are completed at said finishing station and for subsequently indexing said machine tool when said gauge is fully retracted.

15. The machine tool of claim 12 further comprising a feed works platform mounted on said column for supporting a primary drive system for the remaining machining stations of said machine tool, and wherein said positioning motors are mounted to said column beneath said feed works platform.

16. The machine tool of claim 12 further comprising means for measuring a fixed position variation and a zero-reference position of each of said spindles around said worktable and providing said reference position to said control unit.

17. The machine tool of claim 16 wherein said control unit calculates said positional variation for each of said spindles by subtracting said actual spindle position from said zero-reference spindle position and adding the difference to said fixed position variation algebraically.

18. The machine tool of claim 12 wherein said control unit comprises a computerized numerical control system.

19. A method of compensating for positional variations of a workpiece carrying spindle in a multiple workstation machine tool having a rotatable worktable for carrying said spindles, a plurality of machining stations each with a tool slide including one or more finishing stations comprising the steps of:

measuring the location of the spindle on said worktable;

measuring the zero-reference location of each spindle at said finishing station;

identifying each spindle currently positioned at said finishing station and providing an identifying signal therefor;

measuring the actual location of each spindle currently positioned at said finishing station and providing an output signal therefor; and offsetting the motion of the tool slide at said finishing station to compensate for the variation in location of said spindle on said workstation and the deviation of the spindle's actual location from said zero reference location at said finishing station.

\* \* \* \* \*

UNITED STATES PATENT AND TRADEMARK OFFICE
CERTIFICATE OF CORRECTION

PATENT NO. : 5,459,915
DATED     : Oct. 24, 1995
INVENTOR(S) : Jesse W. Mendenhall It is certified that error appears in the above-identified patent and that said Letters Patent is hereby corrected as shown below:

Column 7, line 8, delete "Multi-Au-Matic" and insert -- Mult-Au-Matic --

Signed and Sealed this

Twenty-third Day of January, 1996

Attest:

BRUCE LEHMAN

Attesting Officer

Commissioner of Patents and Trademarks